(12) United States Patent
Bovero

(10) Patent No.: US 10,401,155 B2
(45) Date of Patent: Sep. 3, 2019

(54) APPARATUS AND METHOD FOR SMART MATERIAL ANALYSIS

(71) Applicant: Saudi Arabian Oil Company, Dhahran (SA)

(72) Inventor: Enrico Bovero, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 132 days.

(21) Appl. No.: 15/594,116

(22) Filed: May 12, 2017

(65) Prior Publication Data

US 2018/0328722 A1 Nov. 15, 2018

(51) Int. Cl.
| | |
|---|---|
| *G01B 11/16* | (2006.01) |
| *G01M 5/00* | (2006.01) |
| *G01M 11/08* | (2006.01) |
| *G01L 1/24* | (2006.01) |

(52) U.S. Cl.
CPC ............ *G01B 11/16* (2013.01); *G01B 11/165* (2013.01); *G01L 1/241* (2013.01); *G01M 5/0075* (2013.01); *G01M 5/0091* (2013.01); *G01M 11/081* (2013.01)

(58) Field of Classification Search
CPC ...................................................... G01B 11/16
See application file for complete search history.

(56) References Cited

U.S. PATENT DOCUMENTS

| | | |
|---|---|---|
| 3,184,691 A | 5/1965 | Bell |
| 4,850,693 A | 7/1989 | Deason et al. |
| 4,939,368 A | 7/1990 | Brown |

(Continued)

FOREIGN PATENT DOCUMENTS

| | | |
|---|---|---|
| CA | 2712880 A1 | 2/2012 |
| CN | 1743795 A | 3/2006 |

(Continued)

OTHER PUBLICATIONS

Shailesh K R, "Computational method for optical spectrum analysis using RGB to Hue transformation," Department of Electrical & Electronics Engineering, Manipal Institute of Technology. 10th International Conference of Intelligent Systems and Control (ISCO). 2016.

(Continued)

*Primary Examiner* — Tony Ko
(74) *Attorney, Agent, or Firm* — Leason Ellis LLP

(57) ABSTRACT

A method of inspecting a structure including a photonic material using a movable inspection apparatus includes irradiating a section of the structure, receiving radiation diffracted from a photonic material in the section of the structure, determining a deformation of the photonic material as a function of at least one of i) an intensity of the radiation received ii) a position of the radiation received and iii) a wavelength of the radiation received, and determining if a magnitude of the deformation is higher than a threshold. If the magnitude of the deformation is higher than the threshold data is stored concerning the deformation of the photonic material; contrarily, if the magnitude of the deformation is not higher than the threshold: the inspection at the location of the photonic material is stopped and the inspection apparatus is moved in order to inspect another section of the structure.

17 Claims, 5 Drawing Sheets

(56) References Cited

U.S. PATENT DOCUMENTS

| | | |
|---|---|---|
| 4,986,671 A | 1/1991 | Sun |
| 5,349,442 A | 9/1994 | Deason |
| 5,446,286 A | 8/1995 | Bhargava |
| 5,568,259 A | 10/1996 | M Karnegawa |
| 5,682,237 A | 10/1997 | Belk |
| 5,861,129 A | 1/1999 | Katoot |
| 5,881,200 A | 3/1999 | Burt |
| 5,898,486 A | 4/1999 | Chesko, Sr. |
| 6,091,872 A | 7/2000 | Katoot |
| 6,460,417 B1 | 10/2002 | Potyrailo |
| 6,499,355 B1 | 12/2002 | Potyrailo |
| 6,833,274 B2 | 12/2004 | Lawrence |
| 6,854,327 B2 | 2/2005 | Rambow |
| 7,054,513 B2 | 5/2006 | Herz |
| 7,095,502 B2 | 8/2006 | Lakowicz |
| 7,138,621 B2 | 11/2006 | Wang |
| 7,308,163 B2 | 12/2007 | Bratkovski |
| 7,489,402 B2 | 2/2009 | Selker |
| 7,646,945 B2 | 1/2010 | Jones |
| 7,660,496 B2 | 2/2010 | Roberts |
| 7,780,912 B2 | 8/2010 | Farmer |
| 7,957,617 B2 | 6/2011 | Vollmer |
| 7,961,315 B2 | 6/2011 | Cunningham |
| 8,135,244 B1 | 3/2012 | Sander |
| 8,153,066 B2 | 4/2012 | Weisbuch |
| 8,219,180 B2 | 7/2012 | Gao |
| 8,344,333 B2 | 1/2013 | Lu |
| 8,384,892 B2 | 2/2013 | Cunningham |
| 8,409,524 B2 | 4/2013 | Farmer |
| 8,576,385 B2 | 11/2013 | Roberts |
| 8,725,234 B2 | 5/2014 | Gao |
| 8,852,512 B2 | 10/2014 | Lam |
| 8,854,624 B2 | 10/2014 | Pervez |
| 8,929,411 B1 * | 1/2015 | Safai ............... H01L 31/035218 324/76.11 |
| 9,086,331 B2 | 7/2015 | Carraleo |
| 9,170,172 B2 | 10/2015 | Hunt |
| 9,316,903 B2 | 4/2016 | Chen |
| 2002/0186921 A1 | 12/2002 | Schumacher |
| 2004/0150827 A1 | 8/2004 | Potyrailo |
| 2008/0144001 A1 | 6/2008 | Heeg |
| 2011/0096932 A1 | 4/2011 | Schuijers |
| 2012/0039357 A1 | 2/2012 | Levesque |
| 2013/0321907 A1 | 12/2013 | Kennedy |
| 2014/0323323 A1 | 10/2014 | Cunningham |
| 2015/0268237 A1 | 9/2015 | Kerimo |

FOREIGN PATENT DOCUMENTS

| | | |
|---|---|---|
| CN | 1831486 A | 9/2006 |
| CN | 1844856 A | 10/2006 |
| CN | 102230834 A | 11/2011 |
| CN | 103808441 A | 5/2014 |
| CN | 103811998 A | 5/2014 |
| CN | 103812002 A | 5/2014 |
| CN | 203857939 U | 10/2014 |
| CN | 204115925 U | 1/2015 |
| DE | 102014203254 A1 | 8/2015 |
| EP | 0060685 A1 | 9/1982 |
| EP | 1296117 A1 | 3/2003 |
| GB | 2421075 A | 6/2006 |
| JP | 2007139698 A | 6/2007 |
| WO | 2012098241 A3 | 7/2012 |
| WO | 2014063843 A1 | 5/2014 |
| WO | 2014111230 A1 | 7/2014 |

OTHER PUBLICATIONS

Priya and Rajesh Nair, "Observation of wavelength-dependent Brewster angle shift in 3D photonic crystals," p. 1-16, Nov. 2016.

* cited by examiner

APPARATUS AND METHOD FOR SMART MATERIAL ANALYSIS

FIELD OF THE INVENTION

The present invention relates to embedded smart materials used for monitoring and detection and in particular relates to an apparatus and method for smart material analysis.

BACKGROUND OF THE INVENTION

Pipeline and vessel structures used in the oil and gas industry are exposed to stresses over time that can accumulate to produce defects in the structure. Unfortunately, it is typically difficult to determine whether such structures are being subjected to damaging stresses until easily observable defects occur.

The availability of non-destructive inspection techniques for structural materials, for instance, nonmetallic pipes used in pipelines, is limited. For the most part, the techniques available so far are either destructive to the material or are experimental and unreliable. Even considering current experimental techniques for non-destructive inspection, no current techniques are able to reliably predict the formation of defects, and are generally used to detect only existing defects.

More specifically, existing building materials and the corresponding systems and techniques for inspection of the materials are inadequate for detecting the presence of stresses on or in the material such as tensile stress or compressive stress with sufficient accuracy and precision such that defects can be predicted before they occur. Currently available technologies for sensing material defects are generally based on mono-dimensional fiber Bragg gratings. These fibers provide mono-dimensional information: i.e., they can detect only stress that occurs along the length of the fiber, and only substantial stresses that correspond to already damaged materials with significant cracks and ruptures in the structural material.

There is a need for systems and methods for detecting perturbations in structural materials that utilize a photonic material, such as an optical grating or a photonic crystal, as a sensitive element for diffraction generation. In addition, there is a need for systems and methods for detecting perturbations in structural materials that quantify deformations in photonic materials through a wavelength change, or a diffraction angle change quantified from an intensity variation. Moreover, there is a need for systems and methods for detecting perturbations with a sensitivity that is tunable through the choice of the inspecting wavelength and the corresponding periodicity of the photonic structural material. In addition, there is a need for systems and methods for detecting perturbations that have a multi-dimensional level of sensitivity.

It is with respect to these and other considerations that the disclosure made herein is presented.

SUMMARY OF THE INVENTION

According to the present invention, a method of inspecting a structure including a photonic material using a movable inspection apparatus is provided. The method comprises irradiating a section of the structure, receiving radiation diffracted from a photonic material in the section of the structure, determining a deformation of the photonic material as a function of at least one of i) an intensity of the radiation received ii) a position of the radiation received and iii) a wavelength of the radiation received; and determining if a magnitude of the deformation is higher than a threshold. If the magnitude of the deformation is higher than the threshold data is stored concerning the deformation of the photonic material; contrarily, if the magnitude of the deformation is not higher than the threshold: the inspection at the location of the photonic material is stopped and the inspection apparatus is moved in order to inspect another section of the structure.

In some embodiments, the section of the structure is irradiated with monochromatic radiation and the deformation is determined as a function of an intensity of the radiation received. The inspection apparatus can include a radiation source and a radiation sensor, and the deformation can be further determined as (i) a function of the wavelength emitted by the radiation source, (ii) a position of the radiation source with respect to the section of the structure irradiated, and (iii) a distance between the radiation source and the radiation sensor.

In other embodiments, the section of the structure is irradiated with multi-chromatic radiation and the deformation is determined as a function of the wavelength of the radiation received. In implementations in which the photonic material is three-dimensional, the deformation is further determined as a function of a measured wavelength stop band.

In some implementations, the diffracted radiation is received by a camera sensor and the deformation can be further determined as function of position at the camera sensor of the radiation received. The inspection apparatus can include a radiation source, and the deformation can be determined as a function of the wavelength and position of the radiation received, wherein the position of the radiation received comprises a pixel position of captured radiation at the camera sensor, wherein the deformation is further determined as a function of (i) a radiation source position with respect to the section of the structure irradiated, and (ii) a distance between the radiation source and the camera sensor. In some embodiments, the camera sensor includes a plurality of pixel elements that respond to received radiation by expressing a hue, and a wavelength of the received radiation is determined as a function of the expressed hue. In some implementations, the multi-chromatic radiation is in the visible spectrum, while in other implementations, at least a portion of the multi-chromatic radiation is outside of the visible spectrum.

According to other aspects of the present invention, a computer program product comprising a non-transitory computer readable medium comprising program code which when loaded into a computer controls the computer to perform the method described above is provided.

According to other aspects of the present invention, a movable apparatus for inspecting an object including a photonic material is provided. The apparatus comprises a radiation source for irradiating a section of the structure, a radiation sensor for receiving radiation diffracted from a photonic material in the section of the structure, a processor coupled to the sensor configured to determine a deformation of the photonic material as a function of at least one of i) an intensity of the radiation received ii) a position of the radiation received and iii) a wavelength of the radiation received, and to determine if a magnitude of the deformation is higher than a threshold, and a storage medium coupled to the processor. If the magnitude of the deformation is higher than the threshold the processor directs data concerning the deformation of the photonic material to the storage medium; contrarily, if the magnitude of the deformation is not higher than the threshold, the processor causes a stoppage of the inspection at the location of the photonic material, and transmits a signal causing the inspection apparatus to move and to inspect another section of the structure.

In some embodiments, the radiation source emits monochromatic radiation and deformation of the photonic material is determined as a function of an intensity of the radiation received at the radiation sensor. In other embodiments, the radiation source emits multi-chromatic radiation and the deformation of the photonic material is further determined as a function of the wavelength of the radiation received. In some implementations, the multi-chromatic wavelength is in the visible spectrum and the radiation sensor comprises a camera having a plurality of pixel elements having distinct positions. In such implementations, processor is configured to determine deformation as a function of (i) the wavelength of radiation received, (ii) a pixel element position of captured radiation at the camera sensor, (iii) a position of the radiation source with respect to the section of photonic material, and (iv) a distance between the radiation source and the camera. The plurality of pixel elements respond to received radiation by expressing a hue, and a wavelength of the received radiation is determined as a function of the expressed hue.

In some embodiments, the photonic material is three-dimensional and the processor is configured to further determine deformation of the photonic material as a function of a measured wavelength stop band.

These and other aspects, features, and advantages can be appreciated from the following description of certain embodiments of the invention and the accompanying drawing figures and claims.

DETAILED DESCRIPTION OF CERTAIN EMBODIMENTS OF THE INVENTION

In one or more embodiments, a method of inspecting structures having embedded "smart" materials is provided. An inspection apparatus is positioned so as to emit radiation onto a section of the surface of a structure. Radiation diffracted from smart materials embedded into the surface of the structure is detected using a radiation sensor. Depending on the specific inspection mode applied, a determination is made, based on characteristics of the detected diffracted light, whether the section of the surface inspected has been subject to a threshold level of deformation (i.e., a certain length of deformation). If the deformation is above the threshold level, the detected sensor data is stored and further analysis is performed. If the deformation is below the threshold level, the apparatus is moved to inspect a different section on the surface of the structure.

In order to monitor the condition of large structures in the field, such as pipelines and storage vessels, the smart materials can be embedded or attached to the structures which act as indicators of structural condition. Smart materials include structures that undergo a change in an index parameter in response to deformation. One important class of smart materials comprises periodic photonic materials, including optical gratings and photonic crystals. Diffraction patterns transmitted by photonic materials in response to irradiation are extremely sensitive to the periodic spacing of their component elements. Thus, any deformation or perturbation from a norm to which embedded photonic materials are subjected, due, for example, to tensile stress, compressive stress, bending, temperature variations, etc., can be revealed in a corresponding difference in the diffraction pattern of the perturbed structure from the norm. The change in diffraction pattern is proportional to the size of the perturbation and can be measured using an inspection apparatus.

The inspection apparatus can operate in different inspection modes, such as, for instance, an angular mode and a wavelength mode. In the angular mode, diffracted radiation is received at a radiation sensor and the deformation is determined as a function of the position at which a diffracted light beam strikes the sensor, or more specifically, the variance of intensity at positions on the sensor. The variance of intensity by location is used to determine a displacement distance. In the wavelength mode, the wavelength, as opposed to the intensity, of light received at one or more specific positions on the light sensor is used to quantify displacement. The sensitivity of the inspection is tunable through the choice of inspecting wavelength and corresponding periodicity of the photonic materials. In one or more embodiments, multiple inspection modes can be combined to assist in the determination of deformation of a structure 102 having an embedded photonic material 103, as will be appreciated from the discussion below.

Figure 1:
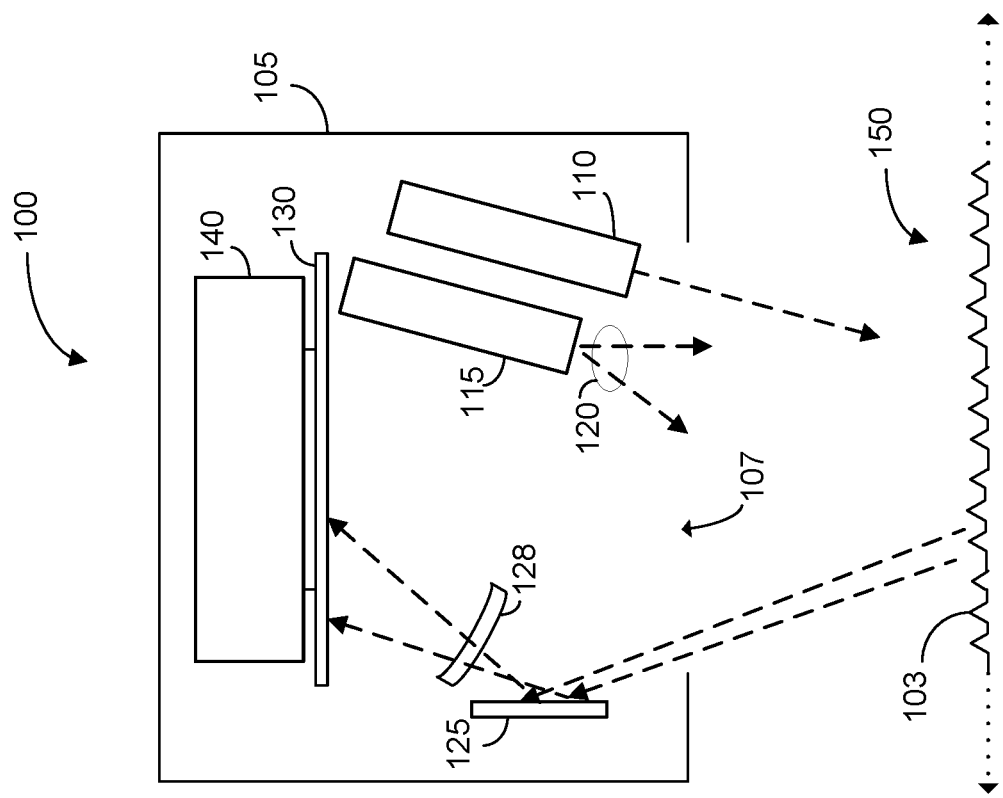
FIG. 1 is a schematic view of an inspection apparatus according to an embodiment of the present invention.

FIG. 1 shows an exemplary embodiment of an inspection apparatus 100 according to the present invention used for inspecting a structure 102 having an embedded photonic material 103. The photonic material 103 can comprise a diffraction grating (preferably) but can also comprise other structures that exhibit a periodic variation in an optical characteristic, such as refraction index. Apparatus 100 comprises a housing 105 containing a number of components used for inspecting the structure that can be positioned and moved as a unit along a length of structure 102. For this purpose the housing 105 can be coupled to a vehicle, such as a robot or drone, or alternatively, the housing can include a driving mechanism and wheels for automatic locomotion. Housing 105 includes an opening 107 for radiation sources and detectors.

Positioned within housing 105 are radiation sources 110, 115 positioned to direct radiation toward a section of the structure 102. Although two radiation sources are depicted, in some embodiments a single source can be used, and in alternative embodiments, more than two sources can be used. In an exemplary implementation, radiation source 110 is a laser source (e.g., a collimated beam having, for instance, a single wavelength) and radiation source 115 is a diffused radiation source that emits a plurality of different wavelengths. The diffused radiation source 115 can take a wide range of forms and can emit radiation over a broad or narrow range of wavelengths, in the visible and/or outside the visible spectrum. For example, the diffused radiation source can be implemented using a white LED, a flash light, an X-ray emitter, or natural ambient radiation. One or more lenses e.g., 120 can be configured to focus the radiation emitted by the diffused radiation source 115 onto the structure 102 for inspection.

Radiation received at photonic material 103 is diffracted and reflected back toward the opening 107 of the inspection apparatus. In some embodiments, apparatus 100 includes a reflector 125 (as depicted) positioned so as to receive radiation diffracted from photonic material 103. Reflector 125 and one or more focusing components 128 are oriented to direct and focus the incoming radiation into a radiation sensor 130. Radiation sensor 130 can be implemented in numerous ways including as a digital camera, infrared detector, charge-coupled device (CCD) photomultiplier, photographic film, etc. In implementations in which the sensor constitutes a single element, the magnitude or intensity of the signal output by the sensor is used to determine displacement. For sensors that include an array of elements, such as a CCD array, the response of a particular array element (i.e., position) provides information from which displacement can be determined. In the embodiment depicted, radiation sensor is coupled to and transmits captured sensor data to a local processor 140. In alternative embodiments, the processor is located remotely and apparatus includes a wireless communication module (shown in FIG. 2) for transmitting the sensor data to the remotely-based processor.

Figure 2:
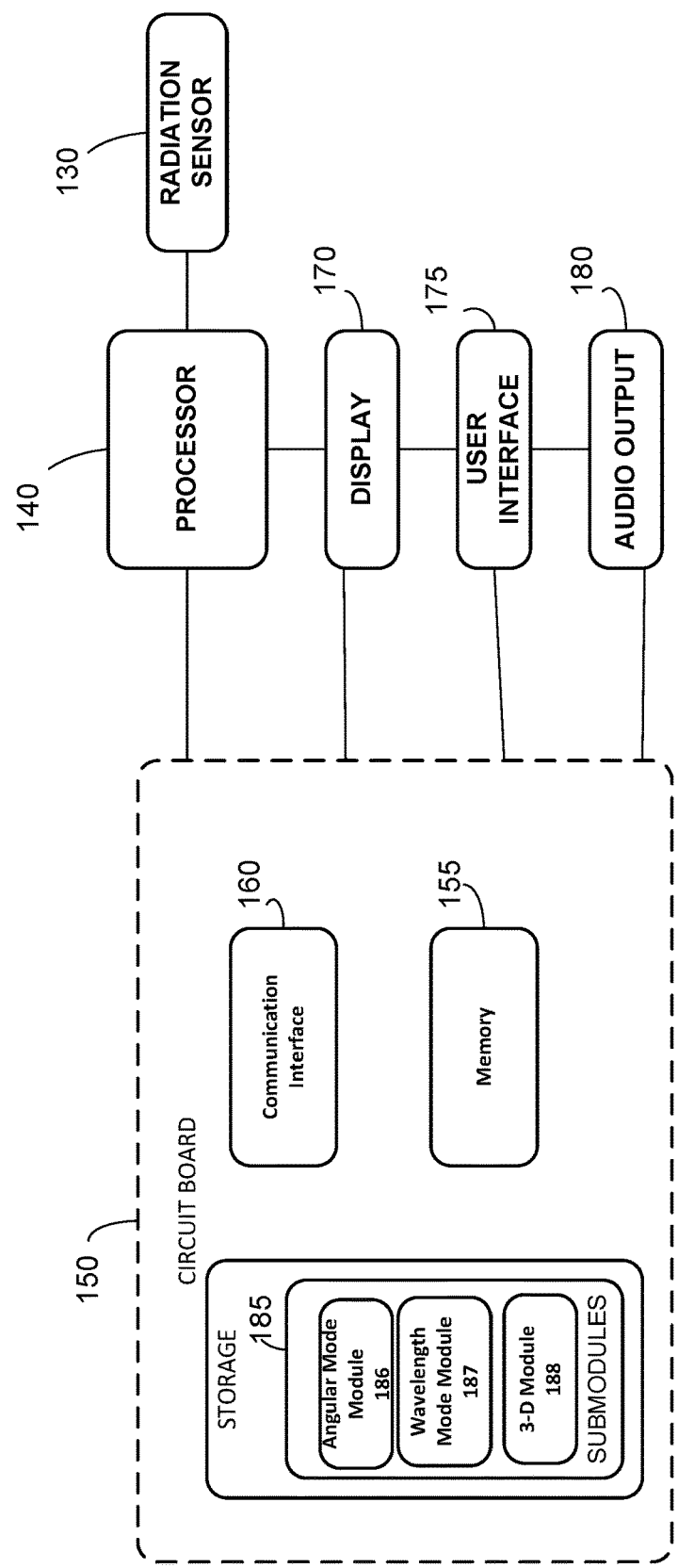
FIG. 2 is a schematic block diagram of components of an inspection apparatus according to an embodiment of the present invention.

The inspection apparatus 100 can be arranged with various computer hardware and software components that serve to enable operation of the inspection device and, more specifically, perform operations relating to the analysis of the information captured by the radiation sensor 130. FIG. 2 is a block diagram depicting exemplary computer hardware and software components of the inspection device 100 including a processor 140 and a circuit board 150. As shown in FIG. 2, the circuit board can include a memory 155, a communication interface 160 and a computer readable storage medium 165 that are accessible by the processor 140. The processor 140 and/or circuit board 150 can also be coupled to a display 170, for visually outputting information to an operator (user), a user interface 175 for receiving operator inputs, and an audio output 180 for providing audio feedback as would be understood by those in the art. As an example, the apparatus 100 could emit a visual signal from the display 170, or a sound from audio output 180 when a defect or deformation above a certain threshold is encountered. The threshold can be set manually or by default prior to the measurement through the user interface 175 which could be a touch screen or suitable keyboard. Although the various components are depicted either independent from, or part of the circuit board 150, it can be appreciated that the components can be arranged in various configurations without departing from the disclosure herein.

The processor 140 serves to execute software instructions that can be loaded into the memory. The processor 140 can be implemented using multiple processors, a multi-processor core, or some other type of processor, as well as by distributed processors that collectively are referred to as a "processor" for purposes of this disclosure. The memory 155 is accessible by the processor 140, thereby enabling the processor to receive and execute instructions stored on the memory and/or on the storage. Memory 155 can be implemented using, for example, a random access memory (RAM) or any other suitable volatile or non-volatile computer readable storage medium. In addition, memory 155 can be fixed or removable. The storage medium 165 can also take various forms, depending on the particular implementation. For example, storage medium 165 can contain one or more components or devices such as a hard drive, a flash memory, a rewritable optical disk, a rewritable magnetic tape, or some combination of the above. The storage medium 165 also can be fixed or removable or remote such as cloud based data storage systems. The circuit board 150 can also include or be coupled to a power source (not shown) source for powering the inspection device.

One or more software modules 185 are encoded in the memory 155 and/or storage medium 165. The software modules can comprise one or more software programs or applications having computer program code or a set of instructions executed in the processor 140. Such computer program code or instructions for carrying out operations and implementing aspects of the systems and methods disclosed herein can be written in any combination of one or more programming languages. While software modules 185 are stored locally on processor 140, the processor can interact with remotely-based computing platform, preferably wirelessly, via a local or wide area network to perform calculations or analysis via communication interface 160.

During execution of the software modules 185, the processor 140 is configured to perform various operations relating to the analysis of the radiation captured by the sensor 130 for detecting and quantify perturbations in the inspected materials as a function of the diffraction pattern, as will be described in greater detail below. The program code of the software modules 185 and one or more of the non-transitory computer readable storage devices (such as the memory 155 and/or the storage 165) form a computer program product that can be manufactured and/or distributed in accordance with the present disclosure, as is known to those of ordinary skill in the art. In addition, information and/or data relevant to the configuration and operation of the present apparatuses and methods can also be stored in association with the software modules. Such information can include prescribed settings and parameters relating to the apparatus and the various materials and photonic materials that can be inspected such as expected diffraction patterns. Similarly, operational parameters that are specific to the inspection apparatus and various modes of operation (e.g., relevant dimensions of apparatus components, thresholds for deformation, radiation intensity) can also be stored.

Figure 3:
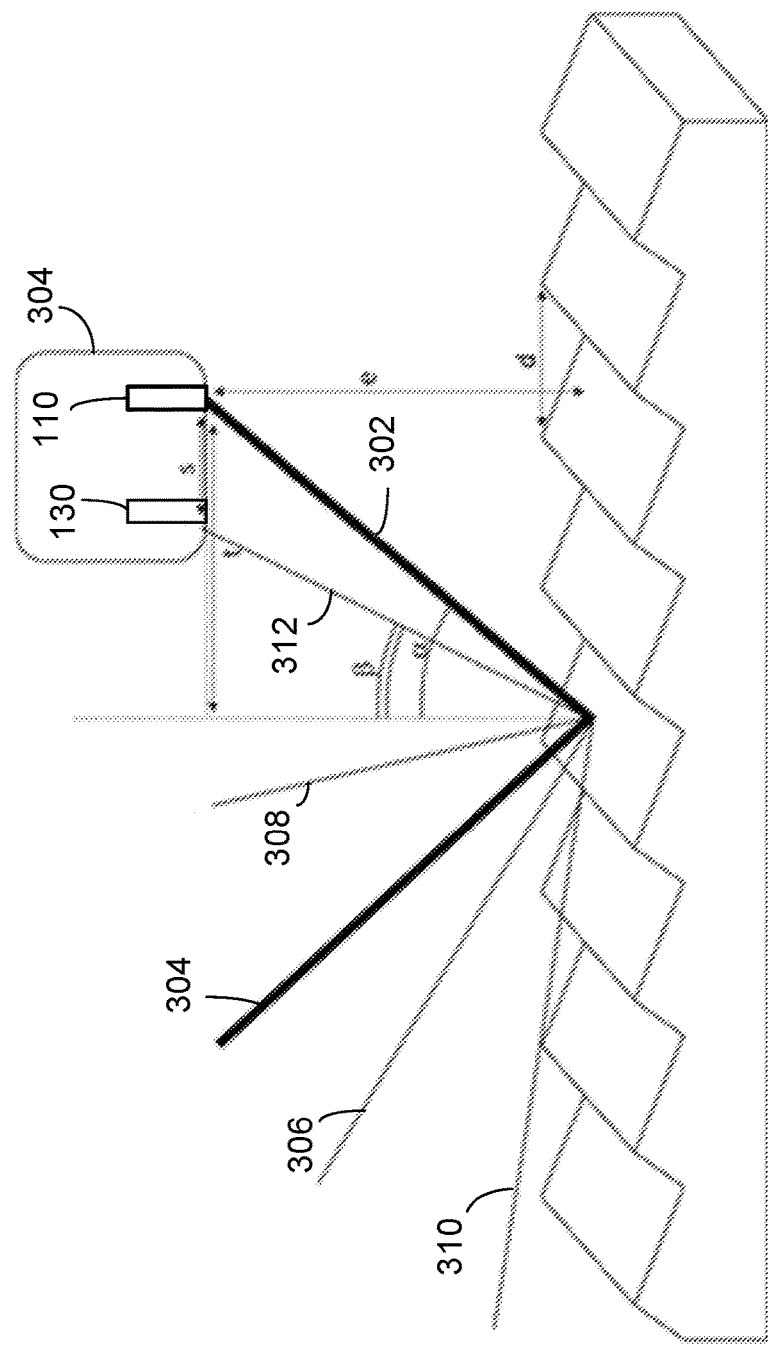
FIG. 3 is a perspective view illustrating the angular mode of inspection according to an embodiment of the present invention.

According to some embodiments of the present invention, the software modules 185 include sub-modules for operating the inspection apparatus and analyzing data in an angular mode 186, a wavelength mode 187, and a three-dimensional mode 188. FIG. 3 is a schematic perspective view illustrating the angular inspection mode. As shown FIG. 3, an embodiment of an inspection apparatus 100 begins an inspection as directed by the angular mode submodule 186 by first irradiating a section of the substrate 102 using radiation source 110, which is preferably a laser (monochromatic) source. Use of a monochromatic source allows the wavelength to be a fixed parameter in the analysis. In FIG. 3, radiation source 110 emits an activation beam 302 onto the photonic grating 103 of structure 102. The incoming beam 302 is reflected via single beam 304, and is also diffracted by the grating along several beam paths, 306, 308, 310, 312 of different order. Beams 306 and 308 are of order 1 and −1, respectively, and beams 310 and 312 are of order 2 and −2. The relationship between the features of the grating 103 and the parameters of the diffraction is given as:

$$d(\sin \alpha - \sin \beta) = n\lambda \tag{1}$$

where d is the distance between grooves in the grating 103, α is the incident angle of beam 302, β is the diffraction angle of one beam 312, which is detected at sensor 130, n is the order of diffraction, and λ is the wavelength of radiation. In this manner, given a constant wavelength (λ), order (n), and activation beam angle (α), any change in grating spacing (d) will depend solely on the detected diffraction angle (β).

Beam 312, having order n=−2, is received by radiation sensor 130. Parameter α is the angle at which beam 302 is directed with respect to a vertical axis, and is therefore known from the configuration and position of the radiation source 110. Parameter β can be calculated by considering the distance e between radiation source 110 and the radiation sensor 130, which is also known from the configuration of these components in apparatus 100, as well as the distance s between the apparatus 100 and the structure surface. In particular, the formula for β is:

$$\beta = \arctan\left(\frac{e\tan\alpha - s}{e}\right) \quad (2)$$

Therefore, given the wavelength (λ) of the laser, the only unknown left in the grating equation (1) is the spacing (d) between the features. A quantification of this distance provides relative and absolute information about the deformation of the material. The distance is relative with respect to the value of the surrounding and also absolute because the value provided is a direct measurement of the status of the material in a specific spot and not a ratio.

As the spacing between the features changes, the value of s in equation (2) also changes in a corresponding manner. The recorded value of s depends on the type of radiation sensor employed. In some embodiments in which the radiation sensor is a single element such as an intensity meter, changes in s are captured as a decrease in signal intensity (where the sensor position is calibrated for maximum intensity for zero deformation). Single-element sensors do not indicate whether the change in displacement is a compression of extension. More preferably, the radiation sensor includes multiple sensitive elements such as a CCD array. By determining variation of intensity of a number of individual elements, multi-element sensors can indicate the direction of change (expansion or compression) as well as the magnitude of the deformation.

Apparatus 100 can also include a proximity sensor (not shown) to automatically determine the distance e between the radiation source and structure surface.

Figure 4:
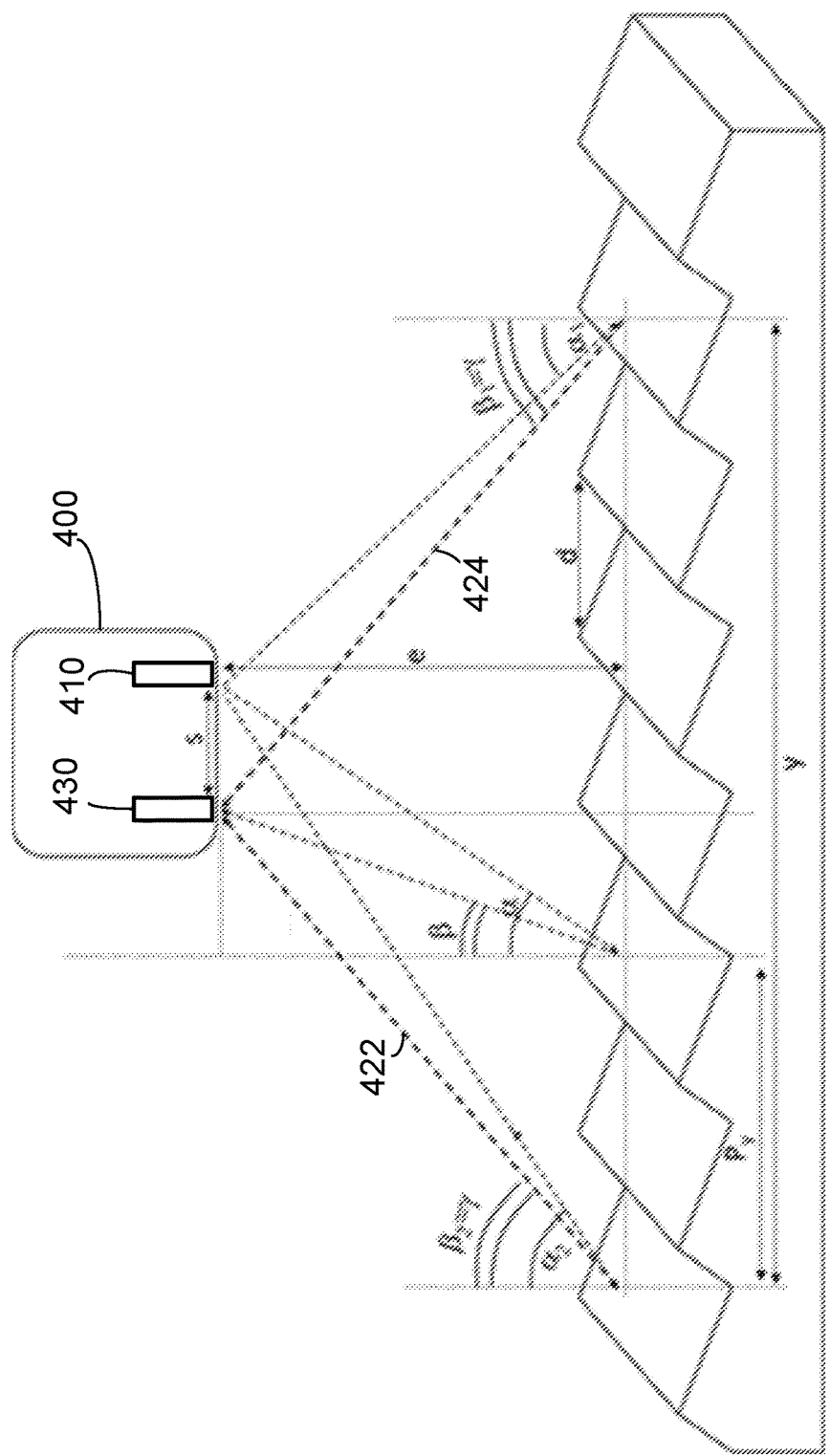
FIG. 4 is a perspective view illustrating the wavelength mode of inspection according to an embodiment of the present invention.

As noted above, in addition to the angular mode, deformations in photonic materials can also be determined by operating the inspection apparatus in a wavelength mode. In the wavelength mode, the wavelength of diffracted light is the signal used to quantify the displacement. In this mode, light having multiple wavelengths (e.g., a multi-chromatic radiation source such as a white light) is directed on the sample and also diffracted according to the grating equation (1). FIG. 4 is a schematic perspective view illustrating the wavelength inspection mode. Another embodiment of an inspection apparatus 400 is shown in FIG. 4. The inspection apparatus includes a multi-chromatic light source 410 and a radiation sensor 430 capable of sensing different wavelengths in a relevant part of the spectrum such as a Ultra Violet light, or visible light, or IR camera. The radiation sensor 430 can be an array of individual sensing elements capable of detecting multiple wavelengths simultaneously. As noted, multiple modes of operation can be combined in certain embodiments with the determination of deformation made as an average of the results returned from each approach, as a weighted average, or the multiple modes of operation can have results compared for validation of the results, or the results of a particular mode of operation can be selected based on prevailing conditions (e.g., humidity at the time of measurement).

In the scheme illustrated in FIG. 4, the illuminated area of the structure surface is encompassed between angles $\alpha_1$ and $\alpha_2$. Each point on the surface that is illuminated diffracts the radiation in various directions, but only a limited range of radiation is collected by radiation sensor 430. The breadth of this range is determined by the size of the radiation sensor 430 and/or of an aperture in the apparatus 400 that leads to the sensor. In any case, due of the typical geometry of commonly fabricated gratings, the range is rather narrow. This narrowness is used to the advantage of detection, since a single wavelength can be associated with each pixel or point in the resultant image generated at the radiation sensor 430. An image collected by the sensor is delimited by the field of view of the sensor itself, which is shown as delimited by the dashed lines 422 and 424 in FIG. 4. This field of view is also delimited by the diffraction angles $\beta_1 = \beta_2 = \gamma$. As illustrated in FIG. 4, different wavelengths at different positions in the image can correspond to the same displacement d. More specifically, all the radiation collected by the sensor 430 is generated by the same displacement d, arrives from different angles, from $\alpha_1$, $\beta_1$ to $\alpha_2$, $\beta_2$, of differing wavelengths.

Accordingly, a photonic material with uniform spacing (i.e., without deformation due to tensile or compressive stresses) diffracts different wavelengths at different angles, and the angle of diffraction and detection position in the sensor image changes uniformly with the wavelength. A displacement will result in a local change of diffraction wavelength for a specific angle, or in a non-uniform change in wavelength over the illuminated area. In order to quantify this displacement is thus important to take several parameters into account: most importantly the relative position of the illuminated spot with respect to the inspection apparatus, and the color (wavelength) detected by radiation sensor 430.

The position of a pixel of a captured wavelength in the collected image can be used to accurately determine the position of the illuminated spot with respect to the apparatus as a whole. For example, it is possible to express the angles α, β corresponding to the diffraction of a generic point as a function of the coordinate of the pixel corresponding to that specific point in the collected image. Angle α can be calculated from trigonometric considerations, by observing that:

$$tg\alpha = \frac{\frac{y}{2} - P_y + s}{e} \quad (3)$$

In equation (3), tgα is the tangent of α, y is the size of the image on the surface of the material, and $P_y$ is the position of the analyzed spot measured from the extremity of the image corresponding to pixel coordinate 0. $P_y$ can be calculated from the coordinate of the pixel $p_y$, the size of the image in pixels P, and the actual size of the image in length y, as:

$$P_y = \frac{p_y}{P} \cdot y \quad (4)$$

By substituting for $P_y$, equation (3) becomes:

$$tg\alpha = \frac{\frac{y}{2} - \frac{P_y}{P} \cdot y + s}{e} \quad (5)$$

Analogously, angle $\beta$ can be expressed as:

$$tg\beta = \frac{\frac{y}{2} - \frac{P_y}{P} \cdot y}{e} \quad (6)$$

Combining equations (5) and (6) into grating equation (1) yields a grating equation (7) for the wavelength mode:

$$d = \frac{n\lambda}{\sin\left(\arctan\left(\frac{\frac{y}{2} - \frac{P_y}{P} \cdot y + s}{e}\right)\right) - \sin\left(\arctan\left(\frac{\frac{y}{2} - \frac{P_y}{P} \cdot y}{e}\right)\right)} \quad (7)$$

Equation (7) is written in a convenient form because it is typically easy to measure the actual size of the image at a certain distance from the apparatus. Nevertheless, equation (7) can also be expressed by taking into account the angle of image collection ($\gamma$). First, the distance (y) can be expressed as:

$$y = 2e \cdot tg\gamma \quad (8)$$

Incorporating equation (8), equation (7) becomes:

$$d = \frac{n\lambda}{\sin\left(\arctan\left(tg\gamma\left(1 - \frac{2P_y}{P}\right) + \frac{s}{e}\right)\right) - \sin\left(\arctan\left(tg\gamma\left(1 - \frac{2P_y}{P}\right)\right)\right)} \quad (9)$$

Equations (7) and (9) provide the exact value of d, which is used to quantify any displacement in the material. As all parameters are known from the measurement setup and the architecture of the device, the only measured variable is $\lambda$.

The two modes described so far are adapted for the technology in the form of a grating or any other two dimensional structure with planar periodicity. However, the analysis can be extended also to three-dimensional periodic structures. For three-dimensional photonic materials, both angular and wavelength mode analyses are governed by different mechanisms. In a three-dimensional photonic crystal the periodic structure is associated with a periodic modulation of the dielectric constant. The photonic material has regions of allowed bands and forbidden stop bands for wavelengths in a similar way as a semiconductor spans an electronic band structure. An approximation of the wavelength of the stop band can be expressed as a combination of a modified version of Bragg's law of diffraction combined with Snell's law of refraction as:

$$\lambda = \frac{2Sa}{m\sqrt{h^2 + k^2 + l^2}} [\phi n_1 + (1 - \phi) n_2] \quad (10)$$

In equation (10), S is a shrinkage factor, taking into account the eventual shrinkage of the lattice structure during formation, is the parameter of the photonic crystal responsible for the specific stop band considered, m is the order of diffraction, h, k and l are the Miller indices, $\Phi$ is the volume fraction of one of the materials constituting the lattice, and $n_1$, $n_2$ are the refractive indices of the two materials. If there is a deformation of the photonic material, the parameter a will change. As a result, by monitoring the variation of the wavelength of the stop band, it is possible to monitor the distortion of the material. Typically, the change in the angle of observation in three-dimensional periodic structures does not affect the change in wavelength to the same extent as in two-dimensional photonic materials. Generally, there is a range of angles at which the wavelength of the stop band will be constant. However, once the angle changes by a certain magnitude, another lattice plane and lattice constant come into play, and change the stop band.

The measurement can be easily carried out with an apparatus as described above. The measurement can be performed in either reflection mode (i.e. by receiving a reflected beam from the photonic crystal) or alternatively in transmission mode. In reflection mode, the wavelength measured by the radiation sensor will correspond to the wavelength of the stop band. In transmission mode, the wavelength measured will be complementary to the stop band. The angle of incident radiation does not affect the measurements. One useful form of equation (10) for monitoring deformation of a three-dimensional photonic material is:

$$a = \frac{m\lambda\sqrt{h^2 + k^2 + l^2}}{2Sa[\phi n + (1 - \phi) n_2]} \quad (11)$$

In other embodiments, the stop band wavelength can be determined using the absorption spectrum of the structure. For absorption spectrum measurements, the measured value of the peak of the band will correspond to the wavelength of the stop band and not the complementary wavelength.

In some embodiments of methods of the present invention in which a camera is implemented as the radiation sensor, wavelength measurements can be determined using a camera hue scale. The hue (H) of a pixel of a camera can be used as an approximation of the wavelength. For example, in some cameras the hue can be modeled as traversing a 360 arc from red, through yellow, etc. and back to red. The hue increases as the wavelength in the visible range decreases. Therefore, by considering a limited range of hue to match the wavelength in the visible range from approximately 650 nm to 430 nm, it is possible to write an empirical correspondence as:

$$\lambda = 650 - 1.16H \quad (12)$$

The quantification of the wavelength through the hue (H) is not necessarily precise but there is a functional proportionality between the wavelength and hue. Therefore, equation (12) has a strong empirical character and can require calibration. This level of accuracy of the hue scale is sufficient for application in which local variation in deformation is more significant than absolute values.

Figure 5:
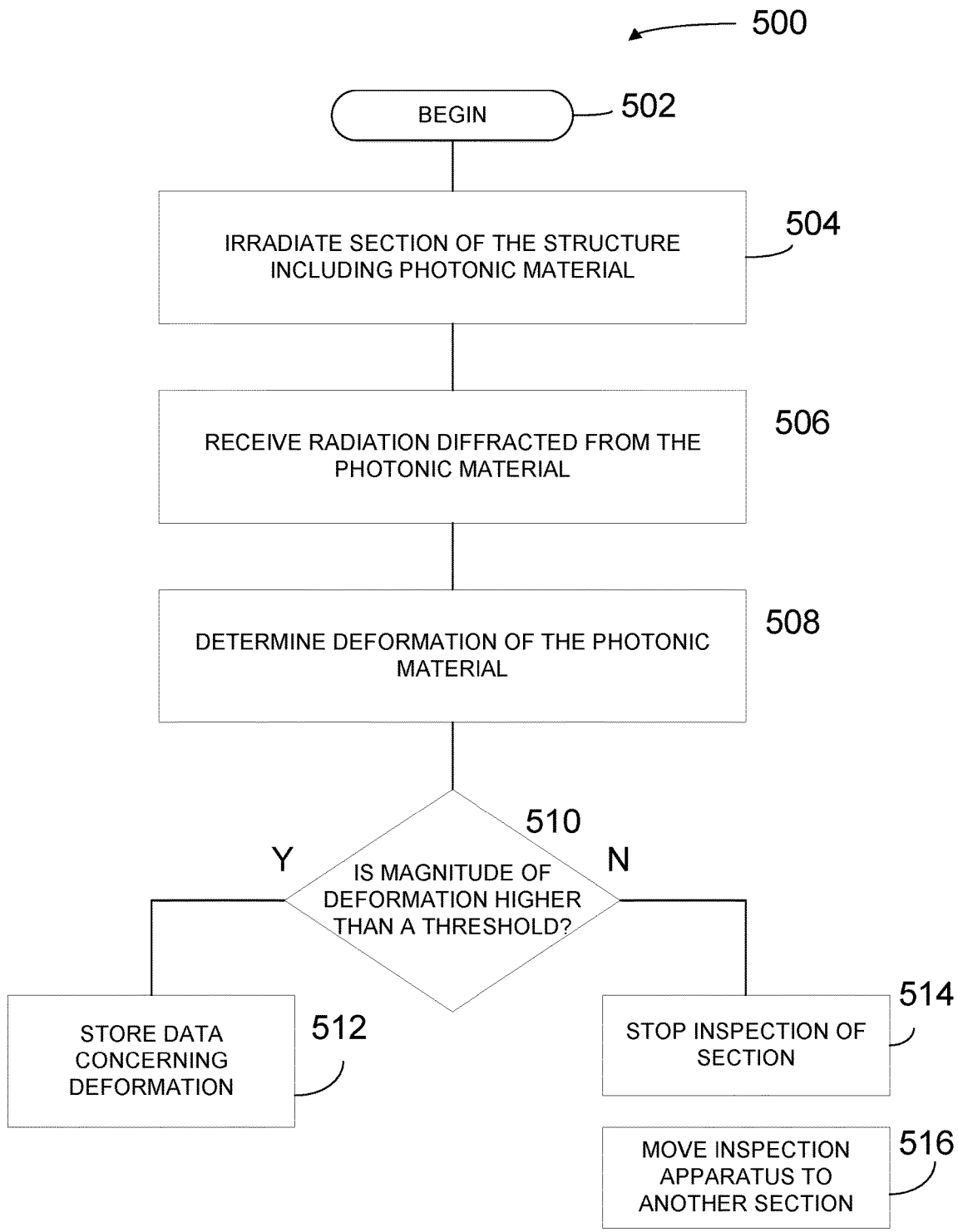
FIG. 5 is a flow chart of a method of inspecting a structure containing a photonic material according to an embodiment of the present invention.

FIG. 5 is a flow chart of a method 500 of inspecting a structure including a photonic material according to an embodiment of the present invention. In step 502 the method begins by positioning an inspection apparatus with respect to a structure to enable inspection of the structure. Positioning can include numerous steps to advance or maneuver a robotic crawling inspection machine, or a drone, or other mechanism on which the detection apparatus can be mounted. In step 504, a section of structure including the photonic material is irradiated. In step 506, radiation diffracted from the photonic material is received. In a following step 508, a deformation of the photonic material is determined as a function of one of i) an intensity ii) a position and iii) a wavelength of the radiation received. In step 510, it is determined if a magnitude of the deformation is higher than a threshold value. If the deformation is higher than the threshold, in step 512, data concerning the deformation of the photonic material is stored. If the deformation is lower than the threshold, in step 514 the inspection of the section of the structure is stopped, and in step 516, the inspection apparatus is moved to another section of the structure is inspected.

Illustrative embodiments and arrangements of the present systems and methods provide a system and a computer implemented method, computer system, and computer program product for inspecting smart structures. The flowchart and block diagrams in the figures illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that any structural and functional details disclosed herein are not to be interpreted as limiting the systems and methods, but rather are provided as a representative embodiment and/or arrangement for teaching one skilled in the art one or more ways to implement the methods.

It should be understood that although much of the foregoing description has been directed to systems and methods for inspecting photonic materials, methods disclosed herein can be similarly deployed other 'smart' structures in scenarios, situations, and settings beyond the referenced scenarios. It should be further understood that any such implementation and/or deployment is within the scope of the system and methods described herein.

It is to be further understood that like numerals in the drawings represent like elements through the several figures, and that not all components and/or steps described and illustrated with reference to the figures are required for all embodiments or arrangements The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing, and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

While the invention has been described with reference to exemplary embodiments, it will be understood by those skilled in the art that various changes can be made and equivalents can be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of inspecting a structure including a photonic material using a movable inspection apparatus, the method comprising:
   irradiating a section of the structure;
   receiving radiation diffracted from a photonic material in the section of the structure;
   determining a deformation of the photonic material as a function of at least one of i) an intensity of the radiation received, ii) a position of the radiation received, and iii) a wavelength of the radiation received; and
   determining if a magnitude of the deformation is higher than a threshold;
   if the magnitude of the deformation is higher than the threshold:
      storing data concerning the deformation of the photonic material;
   if the magnitude of the deformation is not higher than the threshold:
      i) stopping the inspection at the location of the photonic material; and
      ii) moving the inspection apparatus to inspect another section of the structure.

2. The method of claim 1, wherein the section of the photonic material is irradiated with monochromatic radiation and the deformation is determined as a function of an intensity of the radiation received.

3. The method of claim 2, wherein the inspection apparatus includes a radiation source and a radiation sensor, and the deformation is further determined as a function of (i) the wavelength emitted by the radiation source and (ii) a position of the radiation source with respect to the section of the structure irradiated, and (iii) a distance between the radiation source and the radiation sensor.

4. The method of claim 1, wherein the section of the photonic material is irradiated with multi-chromatic radiation and the deformation is further determined as a function of the wavelength of the radiation received.

5. The method of claim 4, wherein the photonic material is three-dimensional and the deformation is further determined as a function of a measured wavelength stop band.

6. The method of claim 4, wherein the diffracted radiation is received by a camera sensor.

7. The method of claim 6, wherein the deformation is further determined as a function of position, at the camera sensor, of the wavelength received.

8. The method of claim 7, wherein the inspection apparatus includes a radiation source and the deformation is determined as a function of the wavelength of radiation and the position of the radiation received, wherein the position of the radiation received comprises a pixel position of captured radiation at the camera sensor, wherein the deformation is further determined as a function of (i) a radiation source position with respect to the section of the structure irradiated and (ii) a distance between the radiation source and the camera sensor.

9. The method of claim 6, wherein the camera sensor includes a plurality of pixel elements that respond to received radiation by expressing a hue, and wherein a wavelength of the received radiation is determined as a function of the expressed hue.

10. The method of claim 9, wherein the wavelength is determined as a linear function of the expressed hue.

11. The method of claim 4, wherein the multi-chromatic radiation is in the visible spectrum.

12. The method of claim 4, wherein at least a portion of the multi-chromatic radiation is outside of the visible spectrum.

13. A computer program product comprising a non-transitory computer readable medium comprising program code which when loaded into a computer controls the computer to perform the method of claim 1.

14. A movable apparatus for inspecting an object including a photonic material comprising:
a radiation source for irradiating a section of the structure;
a radiation sensor for receiving radiation diffracted from a photonic material in the section of the structure;
a processor coupled to the sensor configured to determine a deformation of the photonic material as a function of at least one of i) an intensity ii) a position and iii) a wavelength of the radiation received, and to determine if a magnitude of the deformation is higher than a threshold; and
a storage medium coupled to the processor;
wherein if the magnitude of the deformation is higher than the threshold the processor directs data concerning the deformation of the photonic material to the storage medium; and
wherein if the magnitude of the deformation is not higher than the threshold, the processor causes a stoppage of the inspection at the location of the photonic material, and transmits a signal causing the inspection apparatus to move and to inspect another section of the structure, and
wherein the radiation source emits multi-chromatic radiation and the deformation of the photonic material is determined as a function of the wavelength of the radiation received.

15. The apparatus of claim 14, wherein the multi-chromatic wavelength is in the visible spectrum and the radiation sensor comprises a camera having a plurality of pixel elements having distinct positions.

16. The apparatus of claim 15, wherein processor is configured to determine deformation as a function of (i) the wavelength of radiation received, (ii) a pixel element position of captured radiation at the camera sensor, (iii) a position of the radiation source with respect to the section of the structure irradiated, and (iv) a distance between the radiation source and the camera.

17. The apparatus of claim 16, wherein the plurality of pixel elements respond to received radiation by expressing a hue, and a wavelength of the received radiation is determined as a function of the expressed hue.

* * * * *